March 12, 1968  A. LANSIART ET AL  3,373,283
DEVICE FOR TRIGGERING A NUCLEAR PARTICLE
DETECTOR OF THE GAS TYPE
Filed June 3, 1964

INVENTORS
ALAIN LANSIART
JEAN LELOUP
JEAN LEQUAIS
BY
Bacon & Thomas
ATTORNEYS

United States Patent Office 3,373,283
Patented Mar. 12, 1968

3,373,283
DEVICE FOR TRIGGERING A NUCLEAR
PARTICLE DETECTOR OF THE GAS TYPE
Alain Lansiart, Orsay, Jean Leloup, Gif-sur-Yvette, and
Jean Lequais, Orsay, France, assignors to Commissariat
à l'Energie Atomique, Paris, France
Filed June 3, 1964, Ser. No. 372,324
Claims priority, application France, June 11, 1963,
937,613
4 Claims. (Cl. 250—83.6)

The present invention has for its object a device for triggering a gas-filled detector which permits the localization of beta particles and X-ray photons or gamma-ray photons, this being achieved by means of a spark which is produced at the point at which the particle strikes the detector.

The ionization of a gas under the influence of ionizing particles is a known process which permits the detection of these particles. A conventional device which permits the visual detection of nuclear radiation by means of this process comprises a spark chamber with parallel grids which is associated with a scintillation detector telescope wherein the coincidence of operation which corresponds to the passage of a particle through the chamber has the effect of applying a high voltage pulse to the electrodes of the chamber. The gas contained in said chamber is ionized along the path of the particle and then traversed by a spark which provides a visual definition of this path, the image of which is recorded by a camera.

The present invention has for its object a device for triggering a gas-filled detector so as to permit the localization of nuclear particles. There can be applied between the cathode and the anode of a gas-filled detector a direct-current voltage having a value which is chosen so as to ensure that the number of electrons produced within the cathode-anode space of the detector as a result of the passage of a charged particle is increased according to the process which is commonly referred to as electron multiplication and without thereby producing a spark, whereupon an electron pulse appears at one of the electrodes of the detector.

The device in accordance with the invention for triggering a gas-filled detector so as to permit the localization of charged particles, of the type in which a direct-current voltage is applied between the cathode and the anode of said gas-filled detector, is characterized in that the pulse which appears at the anode of the detector without formation of sparks and at the time of passage of a charged particle is applied to a high-rate high-gain amplifier, and that the signals produced by said amplifier are transmitted on the one hand to a circuit which blocks the amplifier for a period of time equal to the dead time of the detector and on the other hand to the device for triggering a pulse generator, the output terminal of which is connected to the cathode of said detector.

In accordance with a first alternative form of embodiment, the device for triggering a gas-filled detector is characterized in that the amplifier is coupled to the blocking circuit through a discriminator which eliminates a part of the pulses produced by the detector, the gas pressure prevailing within the detector being comprised between $10^4$ and $10^5$ Pascals where $10^5$ Pascals equals 760 mm. of mercury.

In accordance with a second alternative form of embodiment, the device for triggering a gas-filled detector is characterized in that the amplifier is connected to the blocking device and to the pulse generator through a discriminator which eliminates a part of the pulses produced by the detector and in that a variable time-lag device is placed between the discriminator and the pulse generator.

In a device of this type for triggering a gas-filled detector, the value of the time-lag is determined so that the pulse is applied to the cathode when the ions created at the time of electron multiplication reach said cathode, the value of the gas pressure prevailing within the detector being in that case comprised between 10 and $10^3$ Pascals.

Finally, the triggering device in accordance with the invention can be associated with a detector wherein the cathode is constituted by the association of a photocathode and a scintillator which is mounted against said photocathode, said scintillator being a thallium-activated sodium iodide crystal, a control grid being disposed parallel to the cathode and at a small distance from said cathode.

Reference being made to the accompanying drawings, there will now be described below one example of embodiment of the device in accordance with the invention for triggering a gas-filled detector and permitting the localization of nuclear particles, said example being given without any implied limitation. The practical arrangements which will be described in connection with this example must be considered as forming part of the invention, it being understood that any and all equivalent arrangements could also be adopted without thereby departing from the scope of the invention.

There have been shown in the accompanying drawings only those elements which are necessary for a clear understanding of the invention, the corresponding elements of these figures being designated by identical reference numerals.

Figure 1:
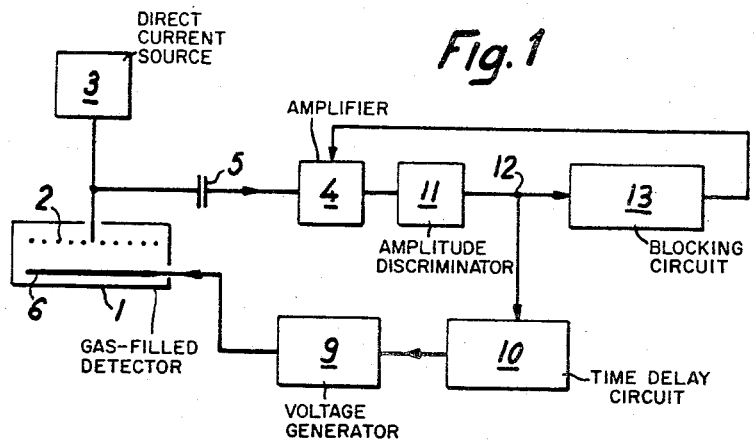
FIG. 1 represents one possible form of embodiment of a device in accordance with the invention.
Figure 2:
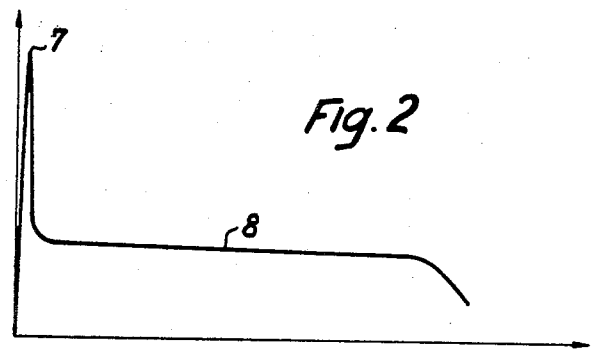
FIG. 2 represents a graph which shows in ordinates the variations in amplitude of an electric pulse delivered by a gas-filled detector associated with the device represented in FIG. 1 as a function of time which is plotted as abscissae.

The device represented in FIG. 1 comprises a gas-filled detector 1, the anode 2 of which is connected on the one hand to a source 3 of constant direct-current potential and on the other hand to the input of a high-rate high-gain amplifier through the intermediary of a junction capacitor 5. The value of the voltage produced by the source 3 is chosen so that a nuclear particle which passes through the cathode 6 and penetrates into the detector 1 results in a multiplication of electrons within the gas of said detector and consequently in the appearance of an electron pulse at the anode 2. However, the electric field strength between anode 2 and cathode 6 is insufficient to permit the striking of a spark between these electrodes. FIG. 2 shows in ordinates the amplitude of the electron pulse 7 as a function of time plotted as abscissae. This very short pulse 7 is followed by a plateau 8 which is substantially horizontal and which is appreciably longer in duration (of the order of ten microseconds). At the time of ionization of the gas contained in the detector 1 along the path of a beta particle or of an X-ray or gamma-ray photon which has penetrated into said detector, the displacement of the electrons which is much faster than that of the ions since electron mobility is very much greater than ion mobility accordingly explains the brief duration of the pulse 7 compared with the duration or length of the plateau 8 which is due to the slow movement of ions. A voltage generator 9 which is triggered by the appearance of an electron pulse at the anode 2 applies to the cathode of the detector a negative voltage pulse. An amplitude discriminator 11 which is coupled to the output of the amplifier 4 delivers at the output 12 thereof an electric pulse which it transmits simultaneously to the generator 9 and to a blocking circuit 13 if the maximum value of the amplitude of the pulse received by said discriminator is comprised between two separately variable thresholds. The choice of the value which corresponds to each threshold permits the discriminator 11 to eliminate a part of the electron pulses delivered by the detector 1. The blocking circuit 13 which receives a pulse from said discriminator 11 delivers, for example, a pulse which paralyzes the amplifier 4 for a period of time which is equal to the dead time of the detector 1, namely of the order of a few milliseconds. When it is desired that the time-lag of the pulse applied to the cathode with respect to the pulse which appears at the anode should be comprised between two hundred and one thousand nanoseconds, there is no longer any need to make use of a special time-lag device inasmuch as the elements 4 and 11 create a sufficient time-lag. However, if it is found desirable that the high-voltage pulse delivered by the generator 9 should be applied to the cathode 6 with a longer time-lag, and simultaneously, for example, with the arrival at said cathode of ions created at the time of electron multiplication, provision is in that case made for a time-lag device 10 which is placed between on the one hand the point 12 which is common to the discriminator 11 and to the blocking device 13 and on the other hand the generator 9. The high-voltage pulse which is applied to the cathode 6 increases the strength of the electric field previously existing between said cathode and the anode 2 up to a value such that a spark which is localized at the point of impact of the nuclear particle on the cathode is accordingly struck between cathode and anode along the preferential path ionized at the time of passage of said particle through the detector 1. After a time interval which is equal to the dead time of the detector 1, the blocking circuit 13 produces no further action on the amplifier 4 which then once again becomes responsive to the electron pulses delivered by the anode 2 of the detector 1. The presence of said blocking circuit and of the discriminator 11 guarantees that the formation of a spark within the detector 1 corresponds solely to the reception of an electron pulse of suitable amplitude by the amplifier 4.

Figure 3:
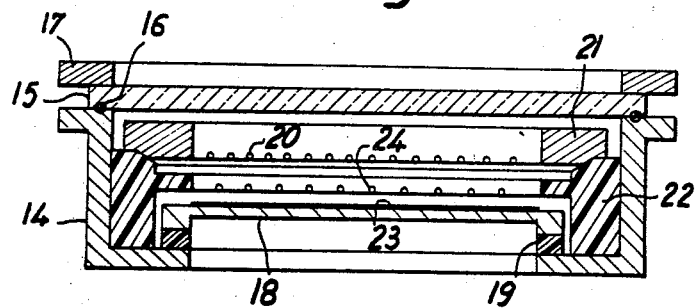
FIG. 3 illustrates a possible form of embodiment of a gas-filled detector associated with the device which is represented in FIG. 1.

The detector 1 is illustrated in FIG. 3 and will now be described.

Said detector is of revolution about a vertical axis. It comprises a metal casing 14 which is made leak-tight at the top by means of a transparent disc 15 of glass which is held applied against the flanges of the casing 14 with interposition of an elastic O-ring seal 16 by means of a metal ring 17. The bottom portion of the casing 14 is closed by a thin, disc-shaped metallic cathode 18 which is coaxial with said casing and electrically insulated from this latter by means of a ring 19. An anode 20 or grid which is made up of metallic wires stretched in a plane in two directions at right angles is disposed in oppositely facing relation to the cathode 18 and at a distance from this latter of the order of three to six millimeters. The cathode 18 and anode 20 have equal diameters of the order of fifteen to twenty centimeters. A support 21 which is electrically insulated from the casing 14 and applied against a bushing 22 of insulating material maintains the anode 20 in position.

The efficiency of detection of nuclear particles which pass through the detector 1 is increased if the metallic cathode 18 is replaced by the association on the one hand of a photocathode 23 against which is mounted a scintillator, in particular a thallium-activated sodium iodide crystal having a shape similar to that of the cathode 18 with, on the other hand, a control grid 24 which is similar to the anode grid 20 and which is disposed in oppositely facing relation with the photocathode 23. The said grid 24 is brought to a positive direct-current potentia having a value which is higher by a few volts than the potential of like nature to which the photocathode 23 is similarly brought. The anode 20 is brought to a positive direct-current potential which is lower by 50 to 100 v. than the disruptive potential. The direct-current field which exists between the photocathode 23 and the grid 24 is lower than the ionization potential of the gas contained in the detector 1 but permits the canalization of the electrons emitted by the photocathode through the multiplying field which exists between the grid 24 and the anode 20. The grid 24 also permits the blocking of electrons emitted by the photocathode, the high-voltage pulse delivered by the generator 9 being accordingly applied to the anode 20.

The atmosphere of the casing 14 consists of a rare gas or a mixture of rare gases under a pressure which either ranges from $10^4$ to $10^5$ P. if the triggering of the detector takes place with a minimum time-lag or from 10 to $10^3$ P. if the triggering of said detector takes place on the contrary with a time-lag of a certain duration. The cathode or scintillator 18 receives the nuclear radiation at the bottom portion thereof and the glass disc 15 permits of either optical observation or photographic recording of the sparks emitted.

The detector according to the invention as associated with a collimator either of the stenopaeic type or of the type which is pierced with a plurality of apertures permits the reproduction of an image which represents the distribution of a radioactive emitter in vivo. Its use is particularly concerned with applications of gamma-scintigraphy for medical purposes.

What we claim is:

1. In a nuclear particle detector, a gap-filled spark chamber housing an anode and a cathode adapted to be energized by a D-C potential, means connected to said anode for amplifying electron pulses caused as nuclear particles pass through said chamber and ionize the gas therein, generator means responsive to such an amplified pulse for applying a high voltage pulse to said cathode to cause a spark in said chamber along the path of a passing nuclear particle, and circuit means also responsive to an amplified pulse for blocking the amplifier means during a predetermined dead time of the spark chamber.

2. A nuclear particle detector according to claim 1 including discriminator means for blocking all output pulses from said amplifier means which do not fall within a predetermined range of values.

3. A nuclear particle detector according to claim 1 including time delay circuit means connected between said discriminator means and said generator means.

4. A nuclear particle detector according to claim 1 wherein the spark chamber has a transparent side and includes a photocathode against which is mounted a crystal of sodium iodide activated with thallium and a grille shaped auxiliary electrode disposed in parallel with said photocathode.

References Cited

UNITED STATES PATENTS

| | | | |
|---|---|---|---|
| 2,534,922 | 12/1950 | Marshall | 250—83.6 X |
| 2,854,584 | 9/1958 | Youmans | 250—71.5 |
| 2,883,548 | 4/1959 | Baker et al. | 250—71.5 |
| 2,896,088 | 7/1959 | Lempert | 250—71.5 X |
| 2,991,364 | 7/1961 | Goodman | 250—71.5 X |

ARCHIE R. BORCHELT, *Primary Examiner.*